United States Patent [19]

Hurner

[11] Patent Number: 4,495,909
[45] Date of Patent: Jan. 29, 1985

[54] OIL CLEANING AND RECYCLING SYSTEM

[76] Inventor: Erwin E. Hurner, 2605 S. Rivershore Dr., Moorhead, Minn. 56560

[21] Appl. No.: 401,533

[22] Filed: Jul. 26, 1982

Related U.S. Application Data

[63] Continuation-in-part of Ser. No. 218,918, Dec. 22, 1980, , which is a continuation-in-part of Ser. No. 192,077, Sep. 29, 1980, abandoned.

[51] Int. Cl.³ .............................................. F02B 13/00
[52] U.S. Cl. ........................... 123/196 R; 123/196 A; 123/196 CP; 184/103 R; 184/105 R
[58] Field of Search ......... 123/196 R, 196 CP, 198 C, 123/198 P, 198 DA, 198 D; 184/103 R, 105 R, 6.4

[56] References Cited

U.S. PATENT DOCUMENTS

| | | | |
|---|---|---|---|
| 3,876,037 | 4/1975 | Rath, Jr. ......................... | 184/103 R |
| 3,882,967 | 5/1975 | Gulla et al. ..................... | 184/103 R |
| 4,091,895 | 5/1978 | Lang .............................. | 184/103 R |
| 4,094,293 | 6/1978 | Evans ............................. | 123/196 R |

Primary Examiner—Craig R. Feinberg
Assistant Examiner—David A. Okonsky
Attorney, Agent, or Firm—Bailey & Hardaway

[57] ABSTRACT

The invention is designed for use with diesel engine over-the-road trucks and periodically extracts a given quantity of oil from the oil pan of the engine and ejects that quantity into the fuel tank for burning along with the regular fuel. In turn, an automatic oil level sensing device continually senses the level of oil in the engine while the engine is running thus insuring a constant infusion of fresh oil into the engine oil supply thereby effectively changing the oil as the vehicle is operated and removing the need for the discrete oil change operation.

8 Claims, 2 Drawing Figures

OIL CLEANING AND RECYCLING SYSTEM

RELATED APPLICATIONS

This application is a continuation-in-part of my application Ser. No. 218,918, filed Dec. 22, 1980, pending, which is in turn a continuation-in-part of my application Ser. No. 192,077 filed Sept. 29, 1980, now abandoned. The disclosures therein are hereby incorporated by reference.

BACKGROUND OF THE INVENTION

In the field of over-the-road trucking, it is highly desirable to be able to minimize the amount of service required on a vehicle in order that the vehicle be available for use on the road for a maximum percentage of time. The changing of oil and corresponding filter accounts for a substantial amount of the maintenance which will be performed on an over-the-road truck during its lifetime. Further, the service life of the diesel engine is directly related to the cleanliness of the oil run in the engine.

Prior known oil addition units have generally utilized a gravity principle similar to the principle by which water coolers operate. Such systems are typically shown in U.S. Pat. Nos. 3,777,852, 4,091,894, 4,107,999 and 4,108,201. These units can be unreliable in that if the line cracks, air may find its way into the oil reservoir thereby dumping the entire contents of the reservoir into the engine.

Thus, it is an object of this invention to provide a device which will substantially reduce the amount of maintenance time required by eliminating the need for discrete oil changes and which will provide for the oil to remain substantially clean and effective as well as maintaining the oil at the optimum level.

SUMMARY OF THE INVENTION

The instant invention is comprised of two subsystems which have separate utility as well as combining to form an extremely efficient and effective oil change and recycling system. A small hydraulic cylinder receives filtered pressurized oil from the output of the engine oil filter. After a predetermined interval of engine operation, the pump is activated thereby displacing a predetermined amount of lubricating oil into the fuel injection return line of the diesel engine whereupon it is mixed with the warm fuel and returned to the fuel tank for later burning along with the diesel fuel. The pump may be activated by either pressurized air from the air reservoir on a diesel truck or by pressurized oil itself in applications where no pressurized air is available. The removal of the predetermined amount of oil at predetermined intervals in conjunction with oil level maintenance allows precise calculation of the effective change interval of the oil thereby allowing the operator to precisely control the level of contaminant in the oil. This aspect is claimed in a companion application now U.S. Pat. No. 4,421,078.

The other subsystem claimed herein is a mechanism for maintaining the oil level in the engine at the desired level. A sensing chamber is mounted adjacent the oil pan of the engine and contains a sensor at the desired oil level. The chamber is connected by means of a number 8 Aeroquip line to the oil pan, the size of the Aeroquip line serving to desensitize the sensing chamber of sudden changes of oil level. The sensing chamber is vented to the crankcase breather so as to allow the sensor to accurately read the level of the oil. The use of the remote sensing chamber allows the sensing of oil level while the engine is running and a control module continuously checks to see whether the oil level is at the desired level after the engine has warmed up. If it is not, the control module opens a solenoid valve which allows oil from the reservoir to flow into the engine until the desired level has been reached. The oil reservoir is pressurized by means of tractor air or may be mounted such that gravity flow is utilized.

These and other objects and advantages of my invention will appear more fully from the following description made in conjunction with the accompanying drawings wherein like reference characters refer to the same or similar parts throughout the several views.

DESCRIPTION OF THE PREFERRED EMBODIMENT

Figure 1:
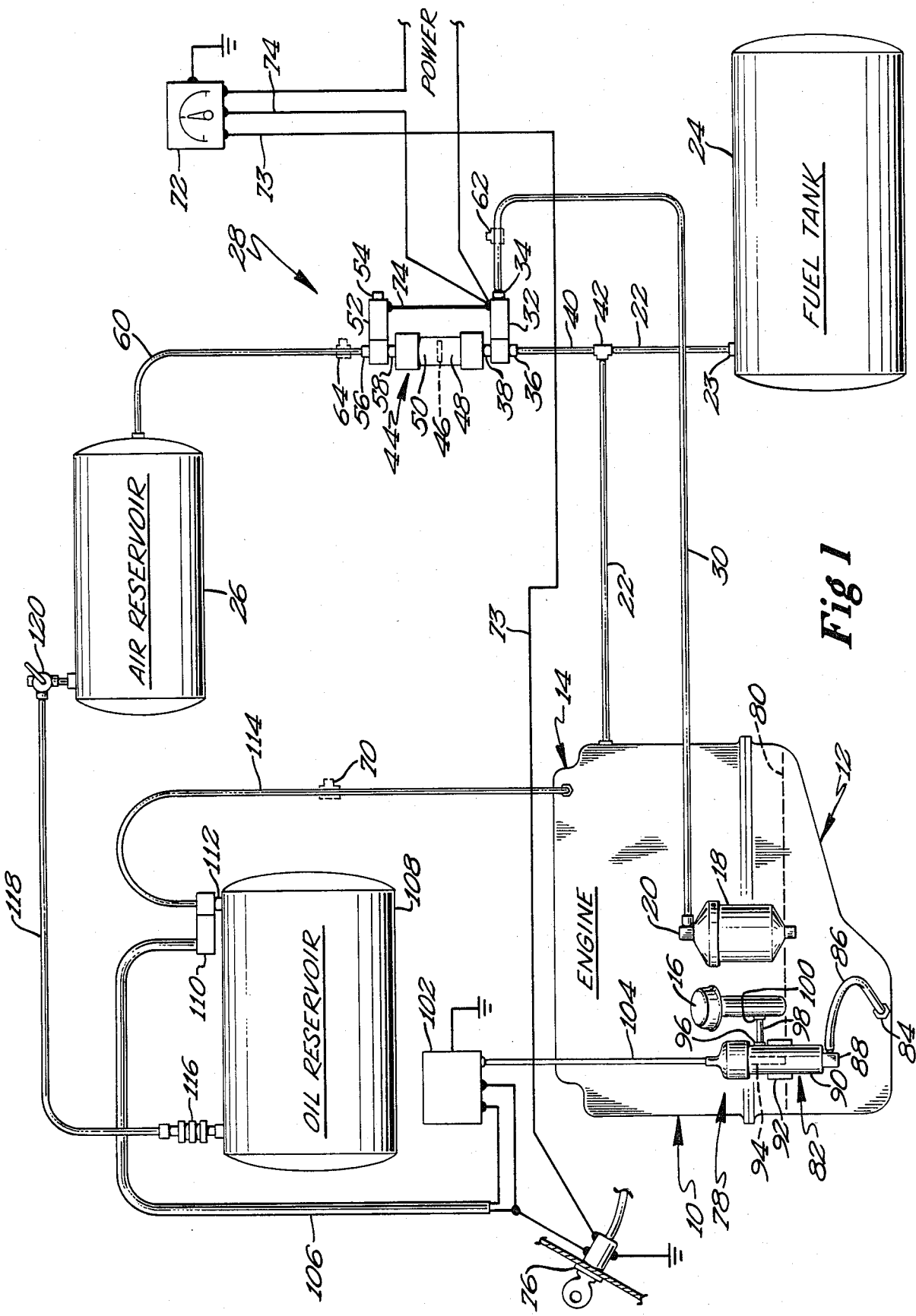
FIG. 1 is a schematic of the invention.

Referring to FIG. 1, the instant invention is designed generally for use with a diesel engine 10 having an oil pan 12 and a valve cover 14. Such engines 10 will also typically have a crank case breather 16 and oil filter 18. Oil filter 18 typically has a pressurized outlet 20 which is a source of pressurized, filtered oil. Also, engine 10 tends typically to have a fuel return line 22 which leads from the injector pump back to the fuel tank 24. Fuel return line 22 enters tank 24 at fitting 23 in the top thereof. Lastly, such vehicles typically have an air reservoir 26 thereon which is used for operation of the brakes. As will be more fully explained hereinafter, if such source of pressurized air is available, then the use of that source is preferred however the instant invention is also designed for use in vehicles not having such a source of pressurized air.

In the oil removal and changing system 28, a supply line 30 is attached to oil filter pressurized outlet 20 at one end and at the other end to first solenoid 32. Solenoid 32 has first, second and third ports 34, 36, and 38, respectively. When in the normal or non-energized state, the first solenoid 32 connects first port 34 and third port 38 with second port 36 being closed. When energized, first solenoid 32 opens and connects second and third ports 36 and 38 respectively while closing first ports 34. A discharge line 40 is connected at one end to second port 36 of first solenoid 32 and its other end to T-fitting 42 which is interposed in fuel return line 22 between the engine 14 and fuel tank fitting 23.

It is to be noted that desirably T-fitting 42 should be located in fuel return line 22 relatively near engine 10 so as to allow optimum blending of the oil with the fuel. The showing in FIG. 1 is, of course, a schematic representation.

A simple hydraulic cylinder 44 supplied in system 28 and comprises a movable piston 46 therein which divides cylinder 44 into first and second sides 48 and 50 respectively. Cylinder first side 48 is connected to the third port 38 of solenoid 32. A second solenoid valve 52 is provided which has first, second and third ports 54, 56, and 58 respectively. Cylinder second side 50 is connected to the third port 58 of second solenoid 52. In the embodiment wherein the oil removal is accomplished by means of air pressure, second solenoid first port 54 is a vent to the atmosphere while second port 56 is connected to a source of pressurized air 26 by means of line 60. In its normal unenergized state, second solenoid 52 connects ports 54 and 58 while closing port 56. Upon energization, port 54 is closed and ports 56 and 58 are connected.

The oil removal system 28 as described above and shown in solid in FIG. 1 is designed for use with a vehicle having a source of pressurized air. It can also be appreciated that the instant invention may be operated on a vehicle not having such a source of pressurized air and the hook-up for such a system is shown in FIG. 2.

Figure 2:
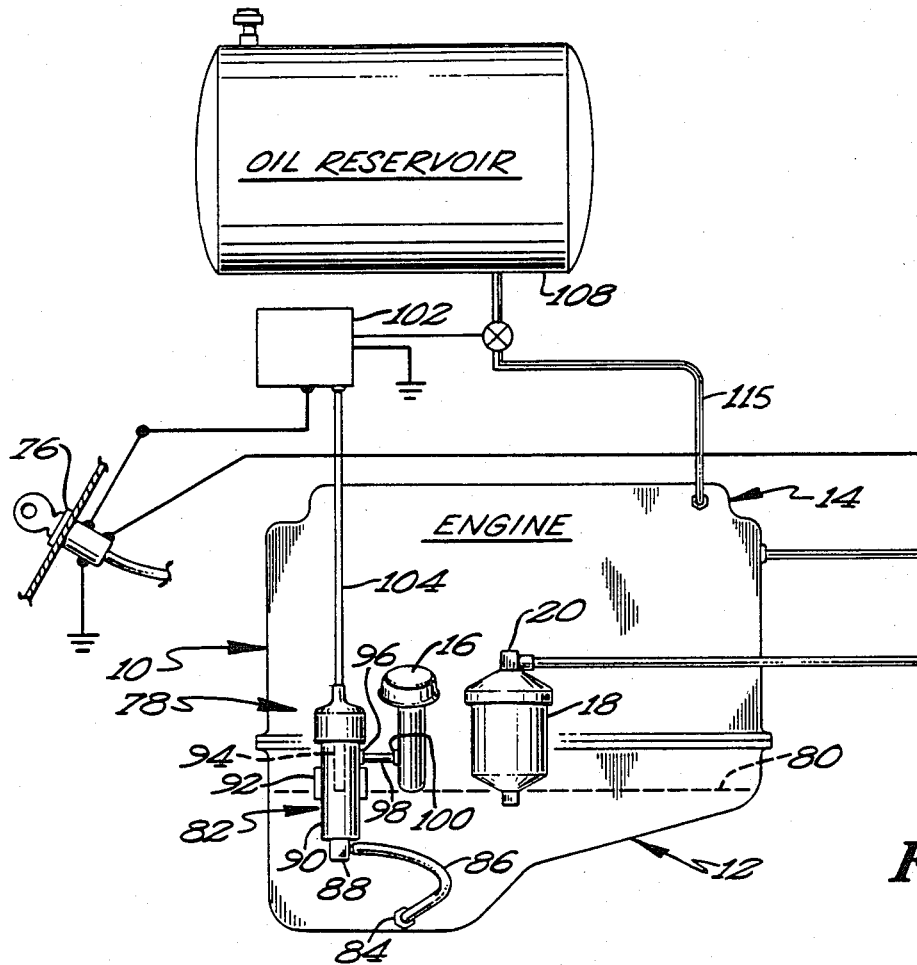
FIG. 2 schematically illustrates another embodiment of the invention.

As illustrated in FIG. 2 the oil reservoir 108 is connected by valve 109 to oil addition line 115. Detection of a low oil level by means to be further described below activates oil level maintenance module 102 for the opening of valve 109 for the gravity flow of oil from reservoir 108 into valve cover 14.

Control module 72 is connected to ignition switch 76 by means of lead 73. The term ignition switch is, of course, used to refer to the switch that controls the running or shut off of the engine even though diesel engines have no ignition as such. Lead 74 connects control module 72 to first and second solenoids 32 and 52 respectively. Control module 72 is also connected to a source of power.

The oil level maintenance subsystem 78 is designed to maintain the desired oil level 80 in oil pan 12 on engine 10. In particular, sensor assembly 82 is mounted adjacent oil pan 12. The fitting 84 is typically inserted into the oil pan drain hole and is connected by a connecting line 86 which is preferably formed of number 8 Aeroquip, the size of which is critical in insuring proper operation of the sensing device by desensetizing the sensor to rapid variations of oil level during cornering and the like. Line 86 is attached to sensor assembly 82 by means of fitting 88 which is in turn threaded into the bottom of sensor tube 90 which is generally cylindrical. Tube 90 is attached to engine 10 by means of bracket 92. Sensor 94 is mounted in the upper end of tube 90 and the lower end of sensor 94 is located at the desired oil level 80. Sensor 82 is connected and vented to breather tube 16 by means of a fitting 96 in the side of tube 90 above desired level 80. Fitting 96 is connected to a vent line 98 which in turn joins breather tube 16 at fitting 100. Vent tube 98 assures that the pressure in sensor 82 is the same as that existing inside the engine oil pan thus yielding an accurate oil level measurement.

An oil level maintenance module 102 is connected to sensor 82 by means of coaxial cable 104. Control module 102 is also connected to solenoid valve 110 on oil reservoir 108 by means of cable 106. Solenoid valve 110 is attached to oil outlet 112 and is normally closed unless energized by control module 102. Oil reservoir 108 is pressurized by pressure line 118 which attaches to reservoir 108 at detachable fitting 116. Pressurization line 118 is connected to a reservoir 26 by means of valve 120. Oil reservoir outlet 112 is in turn connected to oil add line 114 which is connected in turn to valve cover 14 of engine 10. Of course, line 114 may be connected to any place on engine 10 at which it is appropriate to add oil.

Again, on vehicles not possessing an air reservoir 26, the oil maintenance system 78 may be operated on the gravity basis by locating oil reservoir 108 above the point on engine 10 where the oil is added.

OPERATION OF THE INVENTION

When the vehicle is started at ignition switch 76, the impulse timer in control module 72 starts running. During this time, oil supply line 30 is pressurized by engine 10 and because first solenoid 32 is not energized, piston 46 is pushed to the upper end (as shown in FIG. 1) of cylinder 44. After predetermined period of engine operation, the impulse timer in control module 72 energizes solenoids 32 and 52 for a predetermined period of time. Upon energization, port 34 is closed and ports 36 and 38 connected while port 54 is closed and ports 56 and 58 connected thereby allowing air pressure from reservoir 26 to press piston 46 downwardly to the bottom end of cylinder 44 thereby pumping a predetermined fixed volume of oil through line 40 into fuel return line 22. Upon reaching fuel return line 22, the oil easily mixes with the relatively warm returning fuel so as to produce a homogeneous mixture which may be easily burned and which resists separtion upon return to fuel tank 24. After control module 72 has energized solenoids 32 and 52 for a period of time, the solenoids are de-energized thereby returning them to their initial state and refilling cylinder 44 with oil. It is important that solenoids 32 and 52 remain energized for an appreciable amount of time so that the operator can be assured that the cylinder will ccomplete the pumping action. It has been found that a time of seven seconds is sufficient to allow such traversal under all conditions.

While examples are given in my earlier applications, it is important that control modules 72 contain provision for keeping track of the amount of time that has elapsed since the last time the solenoids are energized. For example, if the predetermined interval of time is ten minutes and the engine is shut down 3½ minutes after the last activation of the solenoids, it is important that the control unit contain a provision for remembering that 3½ minutes has already elapsed and that the next energization of the solenoids will take place 6½ minutes after the next time the engine has been started.

The oil level maintenance subsystem 78 is arranged such that after the engine has started via switch 76, a 30 minute delay is provided to allow the engine to come to operating temperature and allow the oil to assume the level associated with normal operating temperature. After the 30 minute delay, sensor 94 is activated. If sensor 94 indicates that the oil level is below the desired level 80, there will be an indication that oil should be added. It should be noted that there is desirably a 25 second delay so that the signal to add oil will not take place until the oil has been below the desired level 80 for 25 seconds. The purpose of this delay is to again to prevent oil from being added when a merely transient condition such as cornering or a hill shows the level in the sensing chamber 82 to be lower than the actual level upon removal of the transient condition. Thus, the delay operates in conjunction with the restrictive line 86 to allow the oil maintenance system 78 to read the true level and perform an accurate maintenance of the level. On the sending of the signal from control module 102 via cable 106 to solenoid 110, therefore opening solenoid 110, oil is added from pressurized reservoir 108 through line 114 to engine 10.

While the preferred embodiments of the present invention have been described, it should be understood that various changes, adaptions and modifications may be made therein without departing from the spirit of the invention and the scope of the appended claims.

What is claimed is:

1. A process for maintaining a predetermined oil level within an oil pan of an internal combustion engine comprising the steps of:
   sensing the amount of oil at a predetermined level;
   signaling the sensing of an oil level below said predetermined level;
   delaying response to said signaling for a first predetermined period of time after initiation of operation of said internal combustion engine;
   delaying a transimission of said signaling until said sensing of an oil level below said predetermined level has perrsisted for a second predetermined period of time independent of said first predetermined period of time; and
   after both first and second predetermined periods of time have elapsed adding oil to said oil pan so as to maintain said predetermined level.

2. An oil level maintenance system for use with an engine having an oil pan having oil therein which it is desired to maintain a predetermined oil level, said system comprising:
   an oil reservoir,
   means for sensing whether the oil in said oil pan is below said predetermined level;
   means responsive to said sensing means for adding oil to said oil pan from said reservoir when the oil level in said oil pan is below said predetermined level after a predetermined period of time; and
   means for delaying response of said oil adding means for an initial predetermined period of time after initiation of engine operation independent of said sensing means.

3. The oil level maintenance system of claim 2 wherein said delay means delays the response of said oil adding means until said engine has reached a predetermined operating temperature.

4. The oil level maintenance system of claim 2 wherein said sensing means is mounted remotely from said oil pan, and comprises restrictor means connecting said sensing means and said pan so as to desensitize said sensing means to sudden changes in oil level.

5. The oil level maintenance system of claim 4 further comprising a sensing chamber having mounted therein said sensing means, said sensing chamber being vented to the crankcase of said engine above said predetermined level.

6. The oil level maintenance system of claim 2 wherein said oil adding means comprises a normally closed solenoid valve in communication with said reservoir and said engine.

7. The oil level maintenance system of claim 6 wherein said reservoir is pressurized.

8. The oil level maintenance system of claim 4 wherein said reservoir is mounted above said engine.

* * * * *